United States Patent
Liu et al.

(10) Patent No.: US 12,494,877 B2
(45) Date of Patent: Dec. 9, 2025

(54) FLEXIBLE TRIGGERING OF APERIODIC SOUNDING REFERENCE SIGNAL (SRS)

(71) Applicant: LENOVO (BEIJING) LIMITED, Beijing (CN)

(72) Inventors: Bingchao Liu, Beijing (CN); Chenxi Zhu, Fairfax, VA (US); Wei Ling, Beijing (CN); Yi Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 408 days.

(21) Appl. No.: 18/041,639

(22) PCT Filed: Aug. 14, 2020

(86) PCT No.: PCT/CN2020/109276
§ 371 (c)(1),
(2) Date: Feb. 14, 2023

(87) PCT Pub. No.: WO2022/032657
PCT Pub. Date: Feb. 17, 2022

(65) Prior Publication Data
US 2023/0318770 A1    Oct. 5, 2023

(51) Int. Cl.
*H04W 72/04* (2023.01)
*H04L 5/00* (2006.01)
(Continued)

(52) U.S. Cl.
CPC ....... *H04L 5/0048* (2013.01); *H04W 72/0446* (2013.01); *H04W 72/231* (2023.01)

(58) Field of Classification Search
CPC .............. H04W 72/231; H04W 72/23; H04W 72/0446; H04W 72/232; H04W 72/044;
(Continued)

(56) References Cited

U.S. PATENT DOCUMENTS 11,071,172 B2 * 7/2021 He ..................... H04W 52/0251
2016/0112977 A1 * 4/2016 Byun .................. H04W 72/541
370/350
(Continued)

FOREIGN PATENT DOCUMENTS

| CN | 108616345 A | 10/2018 |
|---|---|---|
| CN | 110324124 A | 10/2019 |
| CN | 110650001 A | 1/2020 |

OTHER PUBLICATIONS

Qualcomm Incorporated. "Enhancements on SRS flexibility, switching, coverage and capacity" R1-2006795, 3GPP TSG-RAN WG1 Meeting #102-e, Aug. 28, 2020; pp. 1-27.
(Continued)

*Primary Examiner* — Wei Zhao
(74) *Attorney, Agent, or Firm* — AMPACC Law Group, PLLC

(57) ABSTRACT

Methods and apparatuses for triggering an aperiodic SRS are disclosed. A method comprises receiving a RRC signaling configuring N triggering offsets for each of P aperiodic SRS resource sets, where N is 1 or more, P is 1 or more; receiving a MAC CE to activate one or more triggering offset(s) among all configured triggering offsets for each of M out of the P aperiodic SRS resource sets, where M is 1 to P; receiving a DCI containing a non-zero SRS request field triggering at least one aperiodic SRS resource set, wherein at least one triggering offset of each triggered aperiodic SRS resource set is activated by the MAC CE; and transmitting SRS resources contained in each triggered aperiodic SRS resource set in the first available slot among all candidate slots indicated by the activated triggering offsets for each triggered aperiodic SRS resource set.

20 Claims, 7 Drawing Sheets

(a)

(b)

(51) Int. Cl.
*H04W 72/0446* (2023.01)
*H04W 72/231* (2023.01)

(58) Field of Classification Search
CPC ..... H04L 5/0048; H04L 5/0051; H04L 5/005; H04L 5/004
See application file for complete search history.

(56) References Cited

U.S. PATENT DOCUMENTS

2019/0254061 A1    8/2019  Manolakos
2023/0269043 A1*   8/2023  Matsumura ........... H04L 5/0053
                                                        370/329

OTHER PUBLICATIONS

Interdigital, Inc. "Discussion on SRS Enhancements" R1-2005487, 3GPP TSG RAN WG1 #102-e, Aug. 28, 2020; pp. 1-5.
International Search Report and Written Opinion dated May 12, 2021 for International Application No. PCT/CN2020/109276.

* cited by examiner

Figure 1

| R | Serving Cell Index | | | BWP Index | | | |
|---|---|---|---|---|---|---|---|
| R | R | R | R | SRS Resource Set ID | | | |
| $C_7$ | $C_6$ | $C_5$ | $C_4$ | $C_3$ | $C_2$ | $C_1$ | $C_0$ |

| R | Serving Cell Index | | | BWP Index | | | |
|---|---|---|---|---|---|---|---|
| R | R | R | R | SRS Resource Set $ID_1$ | | | |
| $C_{1-7}$ | $C_{1-6}$ | $C_{1-5}$ | $C_{1-4}$ | $C_{1-3}$ | $C_{1-2}$ | $C_{1-1}$ | $C_{1-0}$ |
| ...... | | | | | | | |
| R | R | R | R | SRS Resource Set $ID_M$ | | | |
| $C_{M-7}$ | $C_{M-6}$ | $C_{M-5}$ | $C_{M-4}$ | $C_{M-3}$ | $C_{M-2}$ | $C_{M-1}$ | $C_{M-0}$ |

FLEXIBLE TRIGGERING OF APERIODIC SOUNDING REFERENCE SIGNAL (SRS)

CROSS REFERENCE TO RELATED APPLICATIONS

This application is a national phase entry of International Application No. PCT/CN2020/109276, filed on Aug. 14, 2020, which is incorporated by reference in its entirety.

FIELD

The subject matter disclosed herein generally relates to wireless communications, and more particularly relates to methods and apparatuses for triggering aperiodic sounding reference signal (SRS) with flexibility.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal) (UE), Physical Downlink Shared Channel (PDSCH), Physical Uplink Shared Channel (PUSCH), Physical Uplink Control Channel (PUCCH), Downlink control information (DCI), channel state information reference signal (CSI-RS), band width part (BWP), Media Access Control (MAC), control element (CE), Logical Channel ID (LCID), sounding reference signal (SRS), control resource set (CORESET), slot format indication (SFI), Hybrid Automatic Repeat Request (HARQ), acknowledgement (ACK), Scheduling Request (SR).

Sounding reference signal (SRS) is used for UL and/or DL channel measurement in NR. SRS can be periodic, semi-persistent and aperiodic. A DCI that is transmitted in slot n triggers an aperiodic SRS resource set transmitted in slot n+X, that is X slot(s) later than slot n. X is referred to as a trigger offset. The triggering offset of the aperiodic SRS is configured as a fixed value per SRS resource set by an RRC signaling. So, the flexibility of SRS is limited.

For example, slot n+X may not be a valid UL slot. In this condition, the triggered SRS to be transmitted in slot n+X cannot be transmitted. In addition, slot format can be dynamically changed by DCI format 2_0. When the slot format is changed by DCI, the configured triggering offset for SRS may not be suitable for transmitting the SRS (e.g. the slot to transmit the triggered SRS is changed to a DL slot, or is configured to be used to transmit other UL signals).

Figure 1:
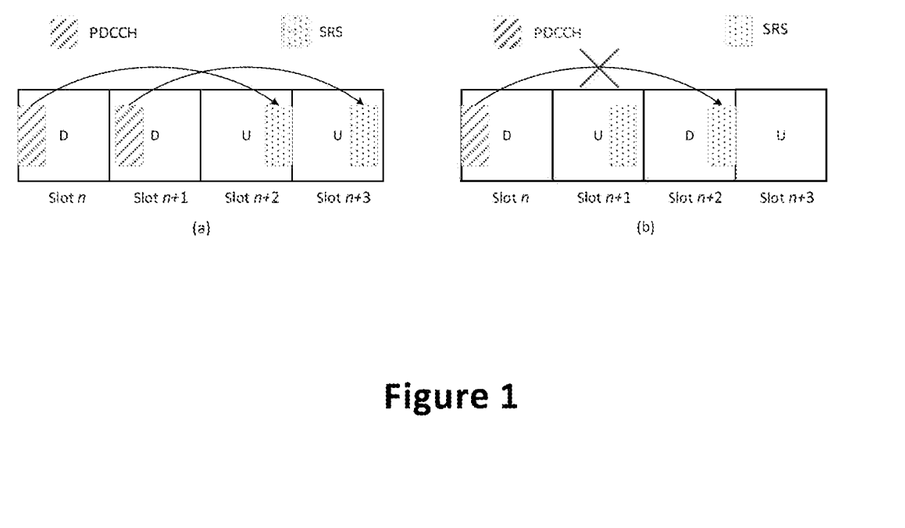
FIG. 1 illustrates an example of aperiodic SRS triggering offset and SFI indication.

An example is shown in FIG. 1. A triggering offset X=2 is configured for one aperiodic SRS resource set. This configuration is suitable for the slot format in (a). However, if the slot format is changed to that shown in (b) by a slot format indication (SFI) indicated by DCI format 2_0, this configuration is not suitable anymore. There has to be a restriction on either aperiodic SRS triggering or SFI indication on slot format.

This invention discloses methods and apparatuses for triggering an aperiodic SRS with more flexibility.

BRIEF SUMMARY

Methods and apparatuses for triggering an aperiodic SRS are disclosed.

In one embodiment, a method comprises receiving a RRC signaling configuring N triggering offsets for each of P aperiodic SRS resource sets, where N is 1 or more, P is 1 or more; receiving a MAC CE to activate one or more triggering offset(s) among all configured triggering offsets for each of M out of the P aperiodic SRS resource sets, where M is 1 to P; receiving a DCI containing a non-zero SRS request field triggering at least one aperiodic SRS resource set, wherein at least one triggering offset of each triggered aperiodic SRS resource set is activated by the MAC CE; and transmitting SRS resources contained in each triggered aperiodic SRS resource set in the first available slot among all candidate slots indicated by the activated triggering offsets for each triggered aperiodic SRS resource set. A value of M can be configured by a higher layer signaling.

In one embodiment, the MAC CE includes at least one bitmap of N bits, each bitmap of N bits indicates the activation or deactivation status of each configured triggering offset for one aperiodic SRS resource set indicated by the MAC CE.

In another embodiment, the first available slot is the slot with the smallest number among all the slots indicated by the activated triggering offset(s) satisfying the conditions of (1) the slot is a valid UL slot; and (2) there is no other UL signal transmitted on any symbol in the slot used for transmission of the SRS resource(s) contained in the triggered aperiodic SRS resource set. Alternatively, the first available slot is the slot with the smallest number among all the slots indicated by the activated triggering offset(s) satisfying the conditions of (1) the slot is a valid UL slot; and (2) there is at least one available symbol in the slot, on which no other UL signal is transmitted, for transmission of at least a part of the SRS resource(s) contained in the triggered aperiodic SRS resource set, and the SRS resource(s) contained in the triggered aperiodic SRS resource set are only transmitted on the symbols on which there is no other UL signal is transmitted, and the SRS resource(s) contained in the triggered aperiodic SRS resource set to be transmitted on the symbol(s) overlapped with the other UL signal are dropped. The other UL signal is any of PUSCH transmission with priority index 0; PUSCH transmission with priority index 1; PUCCH transmission with priority index 1; PUCCH carrying HARQ-ACK, link recovery request and/or SR; and SRS transmission for positioning.

In another embodiment, a remote unit comprises a receiver that receives a RRC signaling configuring N triggering offsets for each of P aperiodic SRS resource sets, where N is 1 or more, P is 1 or more, receives a MAC CE to activate one or more triggering offset(s) among all configured triggering offsets for each of M out of the P aperiodic SRS resource sets, where M is 1 to P; and receives a DCI containing a non-zero SRS request field triggering at least one aperiodic SRS resource set, wherein at least one triggering offset of each triggered aperiodic SRS resource set is activated by the MAC CE; and a transmitter that transmits SRS resources contained in each triggered aperiodic SRS resource set in the first available slot among all candidate slots indicated by the activated triggering offsets for each triggered aperiodic SRS resource set.

In one embodiment, a method comprises transmitting a RRC signaling configuring N triggering offsets for each of P aperiodic SRS resource sets, where N is 1 or more, P is 1 or more; transmitting a MAC CE to activate one or more triggering offset(s) among all configured triggering offsets for each of M out of the P aperiodic SRS resource set, where M is 1 to P; transmitting a DCI containing a non-zero SRS request field triggering at least one aperiodic SRS resource set, wherein at least one triggering offset of each triggered aperiodic SRS resource set is activated by the MAC CE; and receiving SRS resources contained in each triggered aperiodic SRS resource set in the first available slot among all candidate slots indicated by the activated triggering offsets for each triggered aperiodic SRS resource set.

In yet another embodiment, a base unit comprises a transmitter that transmits a RRC signaling configuring N triggering offsets for each of P aperiodic SRS resource sets, where N is 1 or more, P is 1 or more, transmits a MAC CE to activate one or more triggering offset(s) among all configured triggering offsets for each of M out of the P aperiodic SRS resource sets, where M is 1 to P; and transmits a DCI containing a non-zero SRS request field triggering at least one aperiodic SRS resource set, wherein at least one triggering offset of each triggered aperiodic SRS resource set is activated by the MAC CE; and a receiver that receives SRS resources contained in each triggered aperiodic SRS resource set in the first available slot among all candidate slots indicated by the activated triggering offsets for each triggered aperiodic SRS resource set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In order to provide sufficient triggering flexibility for aperiodic SRS, two or more candidate triggering offsets, e.g., $X_1, X_2, \ldots, X_N$ (N is an integer of two or more), are configured for each aperiodic SRS resource set by an RRC signaling. The candidate triggering offsets may be chosen according to an initial slot format configuration.

One or more candidate triggering offset(s) among all the configured candidate triggering offsets can be activated for the aperiodic SRS resource set by a MAC CE. The MAC CE includes a N-bit bitmap to indicate the activation or deactivation status of each candidate triggering offset.

Figure 2:
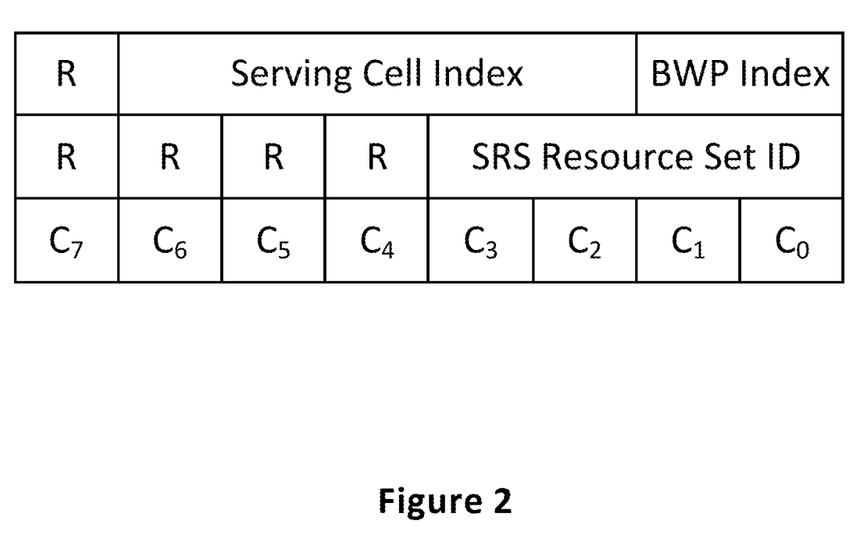
FIG. 2 illustrates a first Triggering Slot Offset Activation/Deactivation for Aperiodic SRS MAC CE.

An example of the MAC CE (e.g. a first Triggering Slot Offset Activation/Deactivation for Aperiodic SRS MAC CE) is illustrated in FIG. 2. The first Triggering Slot Offset Activation/Deactivation for Aperiodic SRS MAC CE (abbreviated as "first MAC CE") is identified by a MAC subheader with a dedicated LCID. It has a variable size consisting of following fields:
  Serving Cell Index: This field indicates the identity of the Serving Cell for which the first MAC CE applies. The length of the field is 5 bits.

BWP Index: This field indicates a DL BWP for which the first MAC CE applies as the codepoint of the DCI or UL bandwidth part indicator field. The length of the BWP Index field is 2 bits.

SRS Resource Set ID: This field indicates an aperiodic SRS resource set for which the first MAC CE applies. The length of the SRS Resource Set ID field is 4 bits so that up to 16 aperiodic SRS resource sets can be configured for one BWP.

$C_n$ (n=0 to N−1): If more than one candidate triggering offset is configured for one aperiodic SRS resource set (indicated by the SRS Resource Set ID field), each $C_n$ indicates the activation or deactivation status of the $(n+1)^{th}$ configured candidate triggering offset. Each $C_n$ is set to 1 to indicate that the $(n+1)^{th}$ configured candidate triggering offset is activated for the aperiodic SRS resource set indicated by the SRS Resource Set ID field. Each $C_n$ field is set to 0 to indicate that the $(n+1)^{th}$ configured slot offset is deactivated for the aperiodic SRS resource set indicated by the SRS Resource Set ID field. One or more candidate triggering offset(s) can be activated for one aperiodic SRS resource set. That is, one or more of the $C_n$ (n=0 to N−1) can be set to 1. In the example of FIG. 2, N is set 8. N is not limited to 8. N is dependent on the number of the candidate triggering offsets configured by the RRC signaling.

R: Reserved bit, set to 0.

The size of the first MAC CE is fixed when N is determined. For example, when N is 8, the size of the first MAC CE is 24 bits.

Although more than one candidate triggering offset (i.e. more than one slot) can be activated for one aperiodic SRS resource set, the SRS resources contained in the triggered aperiodic SRS resource set are only transmitted in one slot. For example, if slot offsets $X_1$, $X_2$ and $X_3$ are activated for one aperiodic SRS resource set, when the one aperiodic SRS resource set is triggered by a DCI transmitted in slot n, the SRS resources contained in the triggered aperiodic SRS resource set are transmitted in the first available slot among the slots $n+X_1$, $n+X_2$, and $n+X_3$.

The first available slot is the slot with the smallest number among all the slots $n+X_k$ (k=1 to K, K is the number of activated $C_n$) satisfying Condition 1 or Condition 2.

Condition 1

(1) The slot is a valid UL slot; and (2) There is no other UL signal transmitted on any symbol in the slot used for transmission of the SRS resource(s) contained in the triggered aperiodic SRS resource set.

Condition 2

(1) The slot is a valid UL slot; and (2) There is at least one available symbol in the slot, on which no other UL signal is transmitted, for transmission of at least a part of the SRS resource(s) contained in the triggered aperiodic SRS resource set.

The slot with the smallest number means the slot indicated by the smallest activated triggering offset. For example, if the activated triggering offsets include 2, 4 and 6 (i.e.

the slots indicated by the activated triggering offsets are n+2, n+4 and n+6), the slot with the smallest number is slot n+2 indicated by the smallest activated triggering offset (i.e. 2).

For both Condition 1 and Condition 2, the other UL signal refers to any UL signal that has higher priority than the triggered aperiodic SRS resource(s), and it can be any of:

(1) PUSCH transmission with priority index 0;
(2) PUSCH transmission with priority index 1;
(3) PUCCH transmission with priority index 1;
(4) PUCCH carrying HARQ-ACK, link recovery request and/or SR;
(5) SRS transmission for positioning.

If the first available slot satisfies Condition 2, the SRS resources contained in the triggered aperiodic SRS resource set are only transmitted on the symbols on which there is no other UL signal is transmitted. The SRS resource(s) contained in the triggered aperiodic SRS resource set that are to be transmitted on the symbol(s) overlapped with the other UL signal are dropped (i.e. not transmitted).

Figure 3:
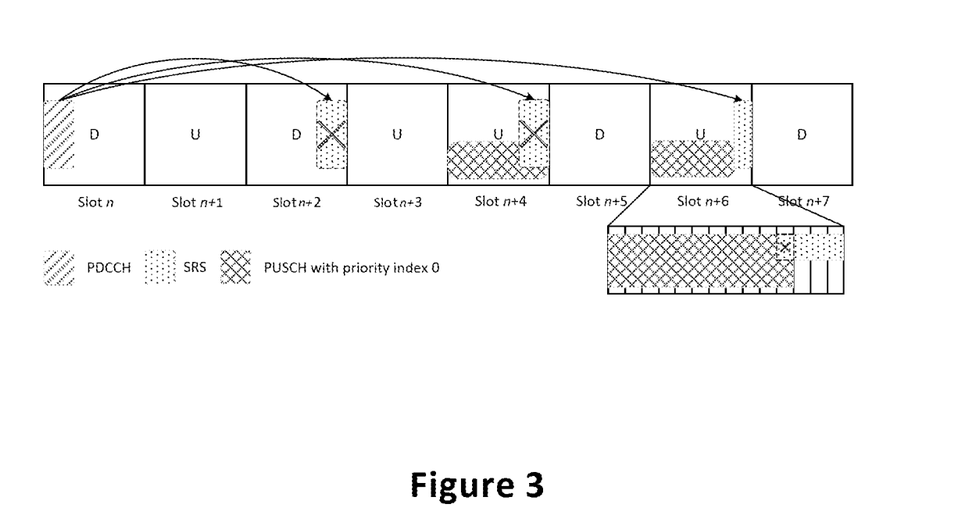
FIG. 3 illustrates an example of determining the first available slot according to Condition 1 and according to Condition 2.

FIG. 3 illustrates an example of determining the first available slot according to Condition 1 and According to Condition 2.

Figure 4:
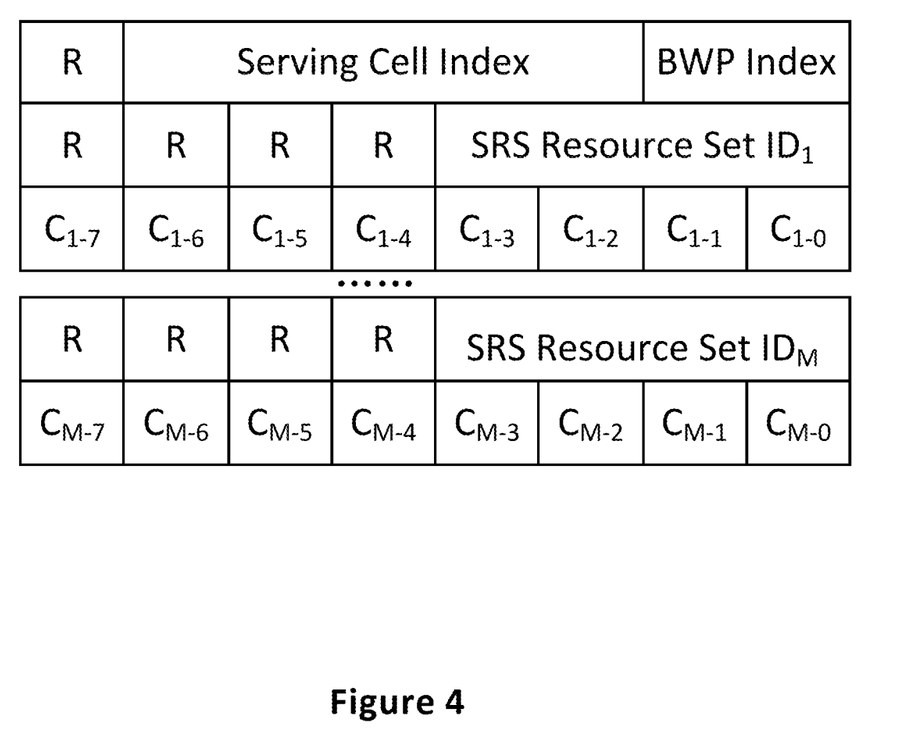
FIG. 4 illustrates a second Triggering Slot Offset Activation/Deactivation for Aperiodic SRS MAC CE.

Triggering offsets $X_1=2$, $X_2=4$ and $X_3=6$ are activated for an aperiodic SRS resource set. The UE receives a DCI containing non-zero SRS request field in slot n as illustrated in FIG. 4. The DCI triggers the aperiodic SRS resource set. The candidate slots for transmission of the aperiodic SRS resources include slots {n+2, n+4, n+6}. Suppose that the SRS resources contained in the aperiodic SRS resource set are configured to be transmitted on the last 4 symbols in a slot, i.e., symbol #10, symbol #11, symbol #12, symbol #13.

Slot n+2 is not an available slot because it is a DL slot.

Slot n+4 is also not an available slot because all symbols for the transmission of the triggered SRS resources (i.e. symbol #10, symbol #11, symbol #12, symbol #13) are overlapped with a PUSCH transmission with priority index 1 (other UL signal).

If Condition 1 is adopted, slot n+6 is not an available slot either, because the PUSCH transmission with priority index 1 overlaps with symbol #10 on which the triggered SRS resources are to be transmitted.

If Condition 2 is adopted, slot n+6 is an available slot, because there are three symbols (symbol #11, symbol #12, symbol #13) on which there is no other UL signals are transmitted. That is, only one symbol (symbol #10) is overlapped with a PUSCH transmission with priority index 1. The SRS resources can be transmitted on symbol #11, #12, #13 in slot n+6, and the SRS resource on symbol #10 can be dropped. As slot n+6 is the only available slot, the triggered SRS resources will be transmitted in slot n+6.

As a whole, up to N candidate triggering offsets (N is one or more) are configured for each of a plurality of (up to 16) aperiodic SRS resource sets by an RRC signaling. One or more candidate triggering offset(s) among all the configured candidate triggering offsets are activated for one aperiodic SRS resource set indicated by the first MAC CE. When a DCI containing a non-zero SRS request field triggers the one aperiodic SRS resource set, the SRS resources contained in the one aperiodic SRS resource set are transmitted in the first available slot among all candidate slots indicated by the activated triggering offsets for the one aperiodic SRS resource set.

As can be seen from the above, the first MAC CE can activate or deactivate the candidate triggering offset(s) of only one aperiodic SRS resource set indicated by the first MAC CE. If the candidate triggering offset(s) of multiple (up to 16) aperiodic SRS resource sets are to be activated or deactivated, the same number of the first MAC CEs as the number of the multiple aperiodic SRS resource sets are to be used.

Another example of the MAC CE (e.g. a second Triggering Slot Offset Activation/Deactivation for Aperiodic SRS MAC CE) that can activate or deactivate candidate triggering offset(s) of multiple aperiodic SRS resource sets is illustrated in FIG. 4. The second Triggering Slot Offset Activation/Deactivation for Aperiodic SRS MAC CE (abbreviated as "second MAC CE") is identified by a MAC subheader with a dedicated LCID. It has a variable size consisting of following fields:

Serving Cell Index: This field indicates the identity of the Serving Cell for which the second MAC CE applies. The length of the field is 5 bits.

BWP Index: This field indicates a DL BWP for which the second MAC CE applies as the codepoint of the DCI or UL bandwidth part indicator field. The length of the BWP Index field is 2 bits.

SRS Resource Set $ID_m$ (m=1 to M): Each of SRS Resource Set $ID_m$ indicates one aperiodic SRS resource set for which the second MAC CE applies. The length of each SRS Resource Set $ID_m$ field is 4 bits so that up to 16 aperiodic SRS resource sets can be configured for one BWP. The number of SRS Resource Set $ID_m$ field contained in the second MAC CE is M, where M can be 1 to P (P is the number of aperiodic SRS resource sets, at least one candidate triggering offset of which is configured by the RRC signaling, and P is 1 to 16).

$C_{m-n}$ (m=1 to M, and n=0 to N−1): If more than one candidate triggering offset is configured for one aperiodic SRS resource set (indicated by the SRS Resource Set $ID_m$ field), each $C_{m-n}$ indicates the activation or deactivation status of the $(n+1)^{th}$ configured candidate triggering offset for the aperiodic SRS resource set indicated by the SRS Resource Set $ID_m$ field. Each $C_{m-n}$ is set to 1 to indicate that the $(n+1)^{th}$ configured candidate triggering offset is activated for the aperiodic SRS resource set indicated by the SRS Resource Set $ID_m$ field. Each $C_{m-n}$ field is set to 0 to indicate that the $(n+1)^{th}$ configured slot offset is deactivated for the aperiodic SRS resource set indicated by the SRS Resource Set $ID_m$ field. One or more candidate triggering offset(s) can be activated for one aperiodic SRS resource set. That is, one or more of the $C_{m-n}$ (n=0 to N−1) can be set to 1 for the aperiodic SRS resource set indicated by the SRS Resource Set $ID_m$ field. In the example of FIG. 4, N is set 8 for each aperiodic SRS resource set indicated by the SRS Resource Set $ID_m$ field. N is not limited to 8. N is dependent on the maximum number of the candidate triggering offsets among the aperiodic SRS resource sets configured by the RRC signaling.

R: Reserved bit, set to 0.

The size of the second MAC CE is variable even if N is a determined value (e.g. 8). When N is 8, the size of the second MAC CE is 8+16*M. That is, the size of the second MAC CE depends on a value of M (i.e. the number of aperiodic SRS resource sets to be configured by the MAC CE). The value of M can be configured by a higher layer signaling. If the value of M is not configured, its default value is 1. Incidentally, when M is equal to 1 for the second MAC CE, the second MAC CE becomes the same as the first MAC CE.

Up to N (N is one or more) candidate triggering offsets are configured for each of multiple (i.e. P which is 1 to 16) aperiodic SRS resource sets by an RRC signaling. The second MAC CE can activate or deactivate the candidate triggering offset(s) of multiple (i.e. M which is 1 to P) aperiodic SRS resource sets. One or more candidate triggering offset(s) among all the configured candidate triggering offsets are activated for each of M aperiodic SRS resource sets (that can be any one or more of the P aperiodic SRS resource sets configured by the RRC signaling) indicated by the second MAC CE. When a DCI containing a non-zero SRS request field triggers one or more aperiodic SRS resource sets (at least one triggering offset of each of the triggered aperiodic SRS resource set(s) is activated by the second MAC CE), the SRS resources contained in each aperiodic SRS resource set are transmitted in the first available slot among all candidate slots indicated by the activated triggering offsets for the each aperiodic SRS resource set.

Figure 5:
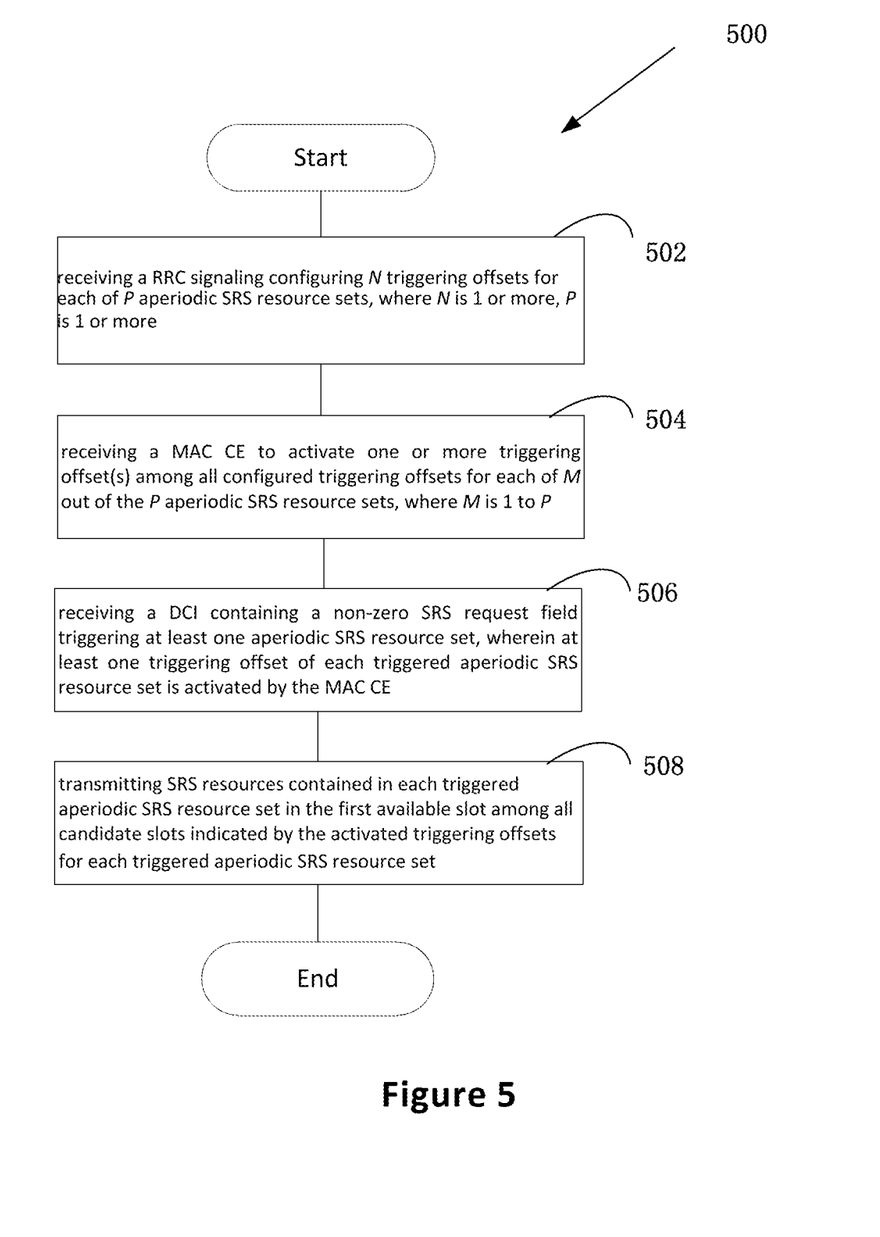
FIG. 5 is a schematic flow chart diagram illustrating an embodiment of a method.

FIG. 5 is a schematic flow chart diagram illustrating an embodiment of a method 500 according to the present application. In some embodiments, the method 500 is performed by an apparatus, such as a remote unit. In certain embodiments, the method 500 may be performed by a processor executing program code, for example, a microcontroller, a microprocessor, a CPU, a GPU, an auxiliary processing unit, a FPGA, or the like.

The method 500 may include 502 receiving a RRC signaling configuring N triggering offsets for each of P aperiodic SRS resource sets, where N is 1 or more, P is 1 or more; 504 receiving a MAC CE to activate one or more triggering offset(s) among all configured triggering offsets for each of M out of the P aperiodic SRS resource sets, where M is 1 to P; 506 receiving a DCI containing a non-zero SRS request field triggering at least one aperiodic SRS resource set, wherein at least one triggering offset of each triggered aperiodic SRS resource set is activated by the MAC CE; and 508 transmitting SRS resources contained in each triggered aperiodic SRS resource set in the first available slot among all candidate slots indicated by the activated triggering offsets for each triggered aperiodic SRS resource set.

Figure 6:
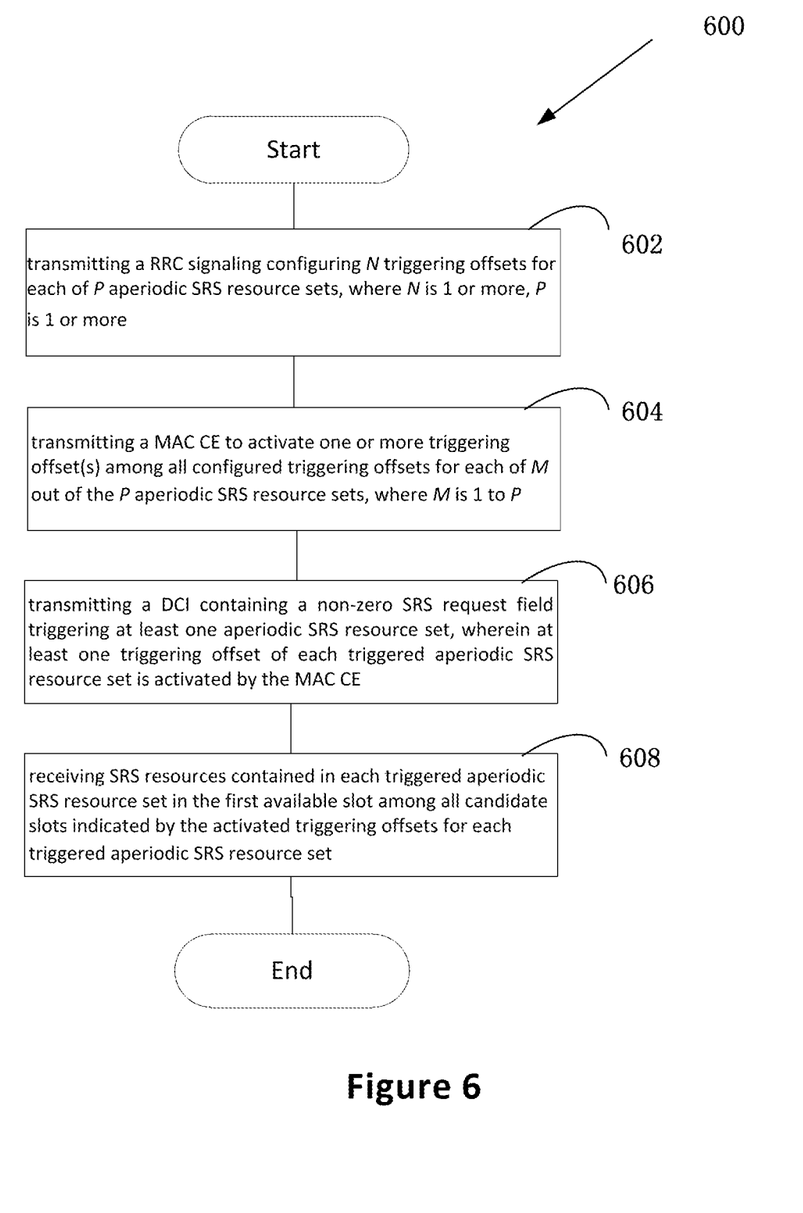
FIG. 6 is a schematic flow chart diagram illustrating a further embodiment of a method.

FIG. 6 is a schematic flow chart diagram illustrating an embodiment of a method 600 according to the present application. In some embodiments, the method 600 is performed by an apparatus, such as a base unit. In certain embodiments, the method 600 may be performed by a processor executing program code, for example, a microcontroller, a microprocessor, a CPU, a GPU, an auxiliary processing unit, a FPGA, or the like.

The method 600 may include 602 transmitting a RRC signaling configuring N triggering offsets for each of P aperiodic SRS resource sets, where N is 1 or more, P is 1 or more; 604 transmitting a MAC CE to activate one or more triggering offset(s) among all configured triggering offsets for each of M out of the P aperiodic SRS resource sets, where M is 1 to P; 606 transmitting a DCI containing a non-zero SRS request field triggering at least one aperiodic SRS resource set, wherein at least one triggering offset of each triggered aperiodic SRS resource set is activated by the MAC CE; and 608 receiving SRS resources contained in each triggered aperiodic SRS resource set in the first available slot among all candidate slots indicated by the activated triggering offsets for each triggered aperiodic SRS resource set.

Figure 7:
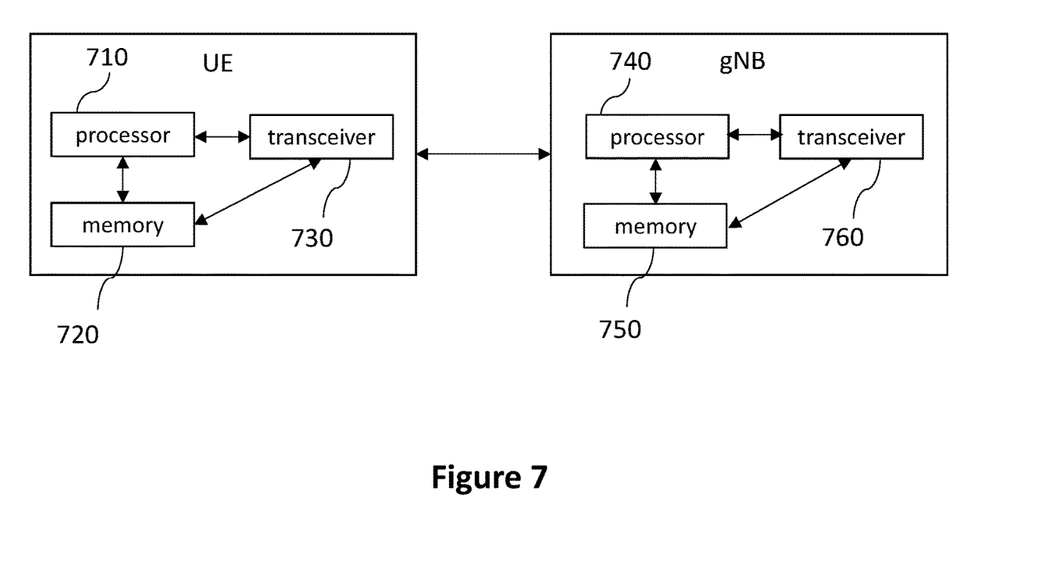
FIG. 7 is a schematic block diagram illustrating apparatuses according to one embodiment.

FIG. 7 is a schematic block diagram illustrating apparatuses according to one embodiment.

Referring to FIG. 7, the UE (i.e. the remote unit) includes a processor 710, a memory 720, and a transceiver 730. The processor implements a function, a process, and/or a method which are proposed in FIG. 5. The gNB (i.e. base unit) includes a processor 740, a memory 750, and a transceiver 760. The processors implement a function, a process, and/or a method which are proposed in FIG. 6. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method, comprising:
receiving a radio resource control (RRC) signaling configuring N triggering offsets for each of P aperiodic sounding reference signal (SRS) resource sets, where N is 1 or more, P is 1 or more;
receiving a media access control (MAC) control element (CE) to activate one or more triggering offsets among all configured triggering offsets for each of M out of the P aperiodic SRS resource sets, where M is 1 to P;
receiving downlink control information (DCI) containing a non-zero SRS request field triggering at least one aperiodic SRS resource set, wherein at least one triggering offset of each triggered aperiodic SRS resource set is activated by the MAC CE; and
transmitting SRS resources contained in each triggered aperiodic SRS resource set in the first available slot among all candidate slots indicated by the activated triggering offsets for each triggered aperiodic SRS resource set.

2. The method of claim 1, wherein, the MAC CE includes at least one bitmap of N bits, each bitmap of N bits indicates the activation or deactivation status of each configured triggering offset for one aperiodic SRS resource set indicated by the MAC CE.

3. The method of claim 1, wherein, the first available slot is the slot with the smallest number among all the slots indicated by the activated triggering offsets satisfying the conditions of (1) the slot is a valid uplink (UL) slot; and (2) there is no other UL signal transmitted on any symbol in the slot used for transmission of the SRS resources contained in the triggered aperiodic SRS resource set.

4. The method of claim 1, wherein, the first available slot is the slot with the smallest number among all the slots indicated by the activated triggering offsets satisfying the conditions of (1) the slot is a valid UL slot; and (2) there is at least one available symbol in the slot, on which no other UL signal is transmitted, for transmission of at least a part of the SRS resources contained in the triggered aperiodic SRS resource set.

5. The method of claim 4, wherein, the SRS resources contained in the triggered aperiodic SRS resource set are only transmitted on the symbols on which there is no other UL signal is transmitted, and the SRS resources contained in the triggered aperiodic SRS resource set to be transmitted on the symbols overlapped with the other UL signal are dropped.

6. The method of claim 3, wherein, the other UL signal is any of
Physical Uplink Shared Channel (PUSCH) transmission with priority index 0;
PUSCH transmission with priority index 1;
Physical Uplink Control Channel (PUCCH) transmission with priority index 1;
PUCCH carrying Hybrid Automatic Repeat Request Acknowledgment (HARQ-ACK), link recovery request and/or Scheduling Request (SR); and
SRS transmission for positioning.

7. A remote unit, comprising:
a receiver that receives a radio resource control (RRC) signaling configuring N triggering offsets for each of P aperiodic sounding reference signal (SRS) resource sets, where N is 1 or more, P is 1 or more, receives a media access control (MAC) control element (CE) to activate one or more triggering offsets among all configured triggering offsets for each of M out of the P aperiodic SRS resource sets, where M is 1 to P; and receives downlink control information (DCI) containing a non-zero SRS request field triggering at least one aperiodic SRS resource set, wherein at least one triggering offset of each triggered aperiodic SRS resource set is activated by the MAC CE; and
a transmitter that transmits SRS resources contained in each triggered aperiodic SRS resource set in the first available slot among all candidate slots indicated by the activated triggering offsets for each triggered aperiodic SRS resource set.

8. The remote unit of claim 7, wherein, the MAC CE includes at least one bitmap of N bits, each bitmap of N bits indicates the activation or deactivation status of each configured triggering offset for one aperiodic SRS resource set indicated by the MAC CE.

9. The remote unit of claim 7, wherein, the first available slot is the slot with the smallest number among all the slots indicated by the activated triggering offsets satisfying the conditions of (1) the slot is a valid uplink (UL) slot; and (2) there is no other UL signal transmitted on any symbol in the slot used for transmission of the SRS resources contained in the triggered aperiodic SRS resource set.

10. The remote unit of claim 7, wherein, the first available slot is the slot with the smallest number among all the slots indicated by the activated triggering offsets satisfying the conditions of (1) the slot is a valid UL slot; and (2) there is at least one available symbol in the slot, on which no other UL signal is transmitted, for transmission of at least a part of the SRS resources contained in the triggered aperiodic SRS resource set.

11. The remote unit of claim 10, wherein, the SRS resources contained in the triggered aperiodic SRS resource set are only transmitted on the symbols on which there is no other UL signal is transmitted, and the SRS resources contained in the triggered aperiodic SRS resource set to be transmitted on symbols overlapped with the other UL signal are dropped.

12. The remote unit of claim 9, wherein, the other UL signal is any of

Physical Uplink Shared Channel (PUSCH) transmission with priority index 0;
PUSCH transmission with priority index 1;
Physical Uplink Control Channel (PUCCH) transmission with priority index 1;
PUCCH carrying Hybrid Automatic Repeat Request Acknowledgment (HARQ-ACK), link recovery request and/or Scheduling Request (SR); and
SRS transmission for positioning.

13. The remote unit of claim 7, wherein, a value of M is configured by a higher layer signaling.

14. A base unit, comprising:

a transmitter that transmits a radio resource control (RRC) signaling configuring N triggering offsets for each of P aperiodic sounding reference signal (SRS) resource sets, where N is 1 or more, P is 1 or more, transmits a media access control (MAC) control element (CE) to activate one or more triggering offsets among all configured triggering offsets for each of M out of the P aperiodic SRS resource sets, where M is 1 to P; and transmits a downlink control information (DCI) containing a non-zero SRS request field triggering at least one aperiodic SRS resource set, wherein at least one triggering offset of each triggered aperiodic SRS resource set is activated by the MAC CE; and a receiver that receives SRS resources contained in each triggered aperiodic SRS resource set in the first available slot among all candidate slots indicated by the activated triggering offsets for each triggered aperiodic SRS resource set.

15. The base unit of claim 14, wherein, the MAC CE includes at least one bitmap of N bits, each bitmap of N bits indicates the activation or deactivation status of each configured triggering offset for one aperiodic SRS resource set indicated by the MAC CE.

16. The base unit of claim 14, wherein, the first available slot is the slot with the smallest number among all the slots indicated by the activated triggering offsets satisfying the conditions of (1) the slot is a valid uplink (UL) slot; and (2) there is no other UL signal transmitted on any symbol in the slot used for transmission of the SRS resources contained in the triggered aperiodic SRS resource set.

17. The base unit of claim 14, wherein, the first available slot is the slot with the smallest number among all the slots indicated by the activated triggering offsets satisfying the conditions of (1) the slot is a valid UL slot; and (2) there is at least one available symbol in the slot, on which no other UL signal is transmitted, for transmission of at least a part of the SRS resources contained in the triggered aperiodic SRS resource set.

18. The base unit of claim 17, wherein, the SRS resources contained in the triggered aperiodic SRS resource set are only transmitted on the symbols on which there is no other UL signal is transmitted, and the SRS resources contained in the triggered aperiodic SRS resource set to be transmitted on the symbols overlapped with the other UL signal are dropped.

19. The base unit of claim 16, wherein, the other UL signal is any of

Physical Uplink Shared Channel (PUSCH) transmission with priority index 0;
PUSCH transmission with priority index 1;
Physical Uplink Control Channel (PUCCH) transmission with priority index 1;
PUCCH carrying Hybrid Automatic Repeat Request Acknowledgment (HARQ-ACK), link recovery request and/or Scheduling Request (SR); and
SRS transmission for positioning.

20. The base unit of claim 14, wherein, a value of M is configured by a higher layer signaling.

* * * * *